United States Patent
Parker et al.

(10) Patent No.: US 7,602,701 B1
(45) Date of Patent: Oct. 13, 2009

(54) WIDEBAND CROSS-CONNECT SYSTEM AND PROTECTION METHOD UTILIZING SONET ADD/DROP MULTIPLEXERS

(75) Inventors: Mandana Nooraee Parker, Plano, TX (US); Paul E. Irek, Sachse, TX (US); Mark Alan Lovell, Lucas, TX (US)

(73) Assignee: Alcatel Lucent, Paris (FR)

( * ) Notice: Subject to any disclaimer, the term of this patent is extended or adjusted under 35 U.S.C. 154(b) by 853 days.

(21) Appl. No.: 10/743,592

(22) Filed: Dec. 22, 2003

(51) Int. Cl.
*G06F 11/08* (2006.01)

(52) U.S. Cl. ................................ 370/217; 370/244

(58) Field of Classification Search ............... 370/229, 370/217, 244; 398/17, 35, 45, 50, 56, 57, 398/58, 59
See application file for complete search history.

(56) References Cited

U.S. PATENT DOCUMENTS

| | | | | | |
|---|---|---|---|---|---|
| 5,822,299 | A * | 10/1998 | Goodman | ............... | 370/228 |
| 5,844,887 | A * | 12/1998 | Oren et al. | ............... | 370/218 |
| 5,909,427 | A * | 6/1999 | Manning et al. | ............... | 370/219 |
| 6,122,249 | A * | 9/2000 | Mochizuki et al. | ............... | 370/220 |
| 6,332,198 | B1 * | 12/2001 | Simons et al. | ............... | 714/6 |
| 6,359,859 | B1 * | 3/2002 | Brolin et al. | ............... | 370/218 |
| 6,771,852 | B2 * | 8/2004 | Hemenway et al. | ............... | 385/24 |
| 6,859,430 | B1 * | 2/2005 | Frank et al. | ............... | 370/216 |
| 6,906,999 | B1 * | 6/2005 | Schulz | ............... | 370/218 |
| 7,058,010 | B2 * | 6/2006 | Chidambaran et al. | ............... | 370/218 |
| 7,133,357 | B2 * | 11/2006 | Tada | ............... | 370/219 |
| 7,200,107 | B2 * | 4/2007 | Kloth | ............... | 370/220 |
| 7,272,116 | B1 * | 9/2007 | Houchen | ............... | 370/258 |
| 2001/0046207 | A1 * | 11/2001 | Isonuma et al. | ............... | 370/223 |
| 2002/0176131 | A1 * | 11/2002 | Walters et al. | ............... | 359/118 |
| 2003/0043737 | A1 * | 3/2003 | Tada | ............... | 370/218 |
| 2003/0117952 | A1 * | 6/2003 | Ueno et al. | ............... | 370/228 |
| 2004/0085893 | A1 * | 5/2004 | Wang et al. | ............... | 370/216 |
| 2004/0085895 | A1 * | 5/2004 | Zettinger et al. | ............... | 370/220 |

OTHER PUBLICATIONS

Bellcore; SONET Dual-Fed Unidirectional Path Switched Ring (UPSR) Equipment Generic Criteria (A Module of TGSR, FR-440); Generic Requirements GR-1400-CORE; Jan. 1999; Issue 2; pp. 684.
Telcordia Technologies; Synchronous Optical Network (SONET) Transport Systems: Common Generic Criteria (A Module of TGSR, FR-440); GR-253-CORE; Sep. 2000; Issue 3; pp. Title, vii-xxvi, and 5-16 through 5-50.

* cited by examiner

*Primary Examiner*—Ricky Ngo
*Assistant Examiner*—Ben H Liu

(57) ABSTRACT

A cross-connect protection method and system having two switch fabrics each coupled to at least one SONET add/drop multiplexer. The SONET add/drop multiplexer utilizes PDI-P codes to determine which signal between a working signal received from a working fabric and protect signal received from a protect fabric to forward on to the client.

12 Claims, 2 Drawing Sheets

WIDEBAND CROSS-CONNECT SYSTEM AND PROTECTION METHOD UTILIZING SONET ADD/DROP MULTIPLEXERS

FIELD OF THE INVENTION

The present invention relates to a WideBand cross-connect system method that comprises at least one SONET add/drop multiplexer, functioning as Client IO Interface, and provides protection to traffic to be cross-connected.

BACKGROUND OF THE INVENTION

Telecommunications network operators typically require that at least some minimal level of redundancy be built into equipment they use in their networks in case of equipment failure. If redundancy were not provided, and an equipment failure occurred, traffic would be lost and customers could lose service for long periods of time while a technician was called in to troubleshoot for and replace the failed equipment with functioning equipment.

Typically, in a cross-connect system, there are redundant switching fabrics. One of these fabric functions as a working fabric and the other as a protect fabric such that if a failure occurs in one fabric the traffic in the other fabric can be used, minimizing traffic and service loss. Communications between the cross-connect interfaces and the working and protect fabrics usually involve proprietary equipment and proprietary signaling methods. Additionally, many ADMs do not have the capability to switch traffic at the VT (VC) level as they are mostly broadband switch machines. With this view, it is decided that operating redundant WideBand switch fabrics into an ADM, a signaling method must be invented to provide the STS1 level of switching available within an ADM on even a single VT level failure.

The proliferation of the use of proprietary interconnections and signaling methods prevents cross-connects from using standardized interfaces with standardized signaling schemes, which are less expensive.

Thus, there is a need for a cross-connect system and protection method that takes advantage of standardized interfaces and signaling schemes.

SUMMARY OF THE INVENTION

The present invention relates to a WideBand cross-connect system and protection method that takes advantage of standardized interfaces and signaling schemes. The WideBand cross-connect system utilizes two switch fabrics communicating with at least one SONET add-drop multiplexer.

Payload Defect Indicator-Path (PDI-P) coding from the GR-253-CORE standard is utilized in many SONET add/drop multiplexers. PDI-P coding was developed and standardized in order to provide STS-1 path-level facility protection in unidirectional, path-switched rings (UPSR). However, it has not been used for equipment protection. The present invention takes advantage of PDI-P coding to provide equipment protection for the switch fabrics.

The present invention has advantages over the prior art. Current solutions require custom-designed hardware and software to implement protection methods for the switching fabrics. The present invention enables the use of standard SONET add-drop multiplexers to provide this functionality.

An embodiment of the present invention relates to a cross-connect system and protection method utilizing PDI-P coding to select from the working and protect copies of a signal.

Another embodiment of the present invention provides a cross-connect system comprising two switch fabrics and at least one SONET add-drop multiplexer.

As such, it is an object of the present invention to provide for a method of protecting switching fabric signals in a cross-connect utilizing PDI-P coding.

It is another object of the present invention to provide for a cross-connect system comprising two switch fabrics and at least one SONET add-drop multiplexer.

DESCRIPTION OF THE PREFERRED EMBODIMENTS

The present invention will be better understood by reference to the accompanying drawings.

Figure 1:
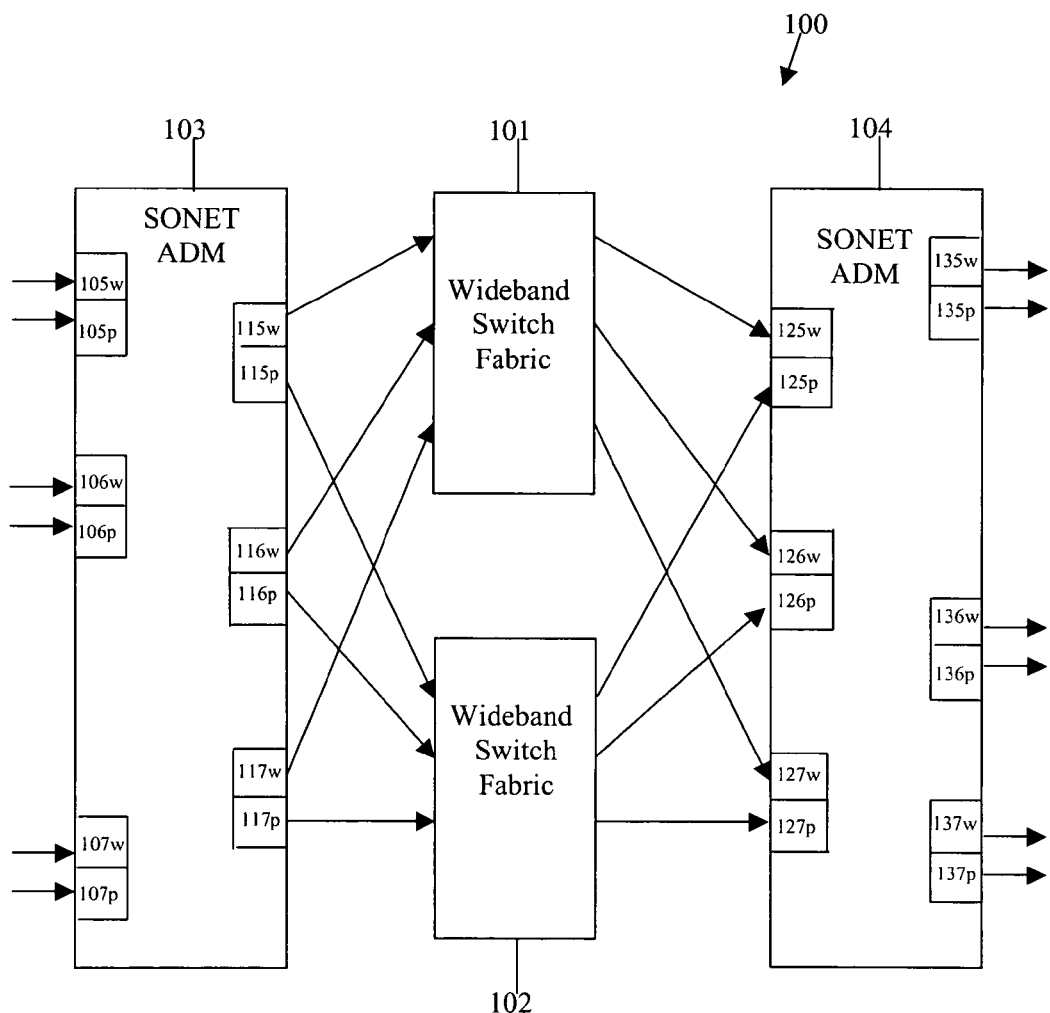
FIG. 1 is a block diagram of a cross-connect system according to an embodiment of the present invention.

Referring now to FIG. 1, a block diagram of a WideBand cross-connect system 100 according to an embodiment of the present invention is shown. Two VT switch fabric subsystems 101 and 102 are provided as well as SONET add/drop multiplexer(s) 103 and 104. SONET add/drop multiplexer(s) 103 and 104 may be a single add/drop multiplexer or a plurality of add/drop multiplexers. Moreover, it may be contained in the same enclosure(s) as the switch fabrics or in a separate enclosure(s). SONET add/drop multiplexers and switch fabric subsystems 101 and 102 are connected through 1+1 protected connections. SONET add/drop multiplexers 103 and 104 support SONET UPSR protection with switching criteria on PDI-P values. Consistent with the standard UPSR selection criteria (defined in GR-253-CORE and GR-1400-CORE) the SONET add/drop multiplexers 103 and 104 can select between the redundant connections using section, line and path layer defects down to the STS-1 level, as will be discussed in more detail with respect to FIG. 2.

Client interfaces 105w, 105p, 106w, 106p, 107w and 107p are shown accepting working and protect signals for a plurality of clients to SONET add/drop multiplexer 103. Although these interfaces are shown separately, some or all of these could be implemented in the form of an aggregate interface if desired, rather than separate physical interfaces. Additionally, for client signals with no protect signal, working interfaces could be solely provided.

Each logical connection between switch fabric 101 and an interface with a SONET add/drop multiplexer 103 or 104 has a redundant connection between switch fabric 102 and a redundant SONET interface on the same SONET add/drop multiplexer. For instance, SONET add/drop multiplexer 103 has working switch interfaces 115w, 116w and 117w connected to working switch fabric 101 and protect switch interfaces 115p, 116p and 117p connected to protect switch fabric 102. Using a standard STS1 UPSR implementation, the traffic payload from the ADM will be broadcast to each of the working switch interfaces 115w, 116w and 117w and its respective protect switch interface 115p, 116p and 117p.

Likewise, working switch interfaces 125w, 126w and 127w between working switch fabric 101 and SONET add/drop multiplexer 104 have counterpart protect switch interfaces 125p, 126p and 127p between protect switch fabric 102 and SONET add/drop multiplexer 104. Ideally, each working switch interface 125w, 126w and 127w and each respective protect switch interface 125p, 126p and 127p would carry the same payload signals. However, problems could occur to a signal on one of the working or protect interfaces, on the lines connecting them with the switch fabrics, or within one of the switch fabrics that would alter the signal rendering it less desirable to pass to a client.

Figure 2:
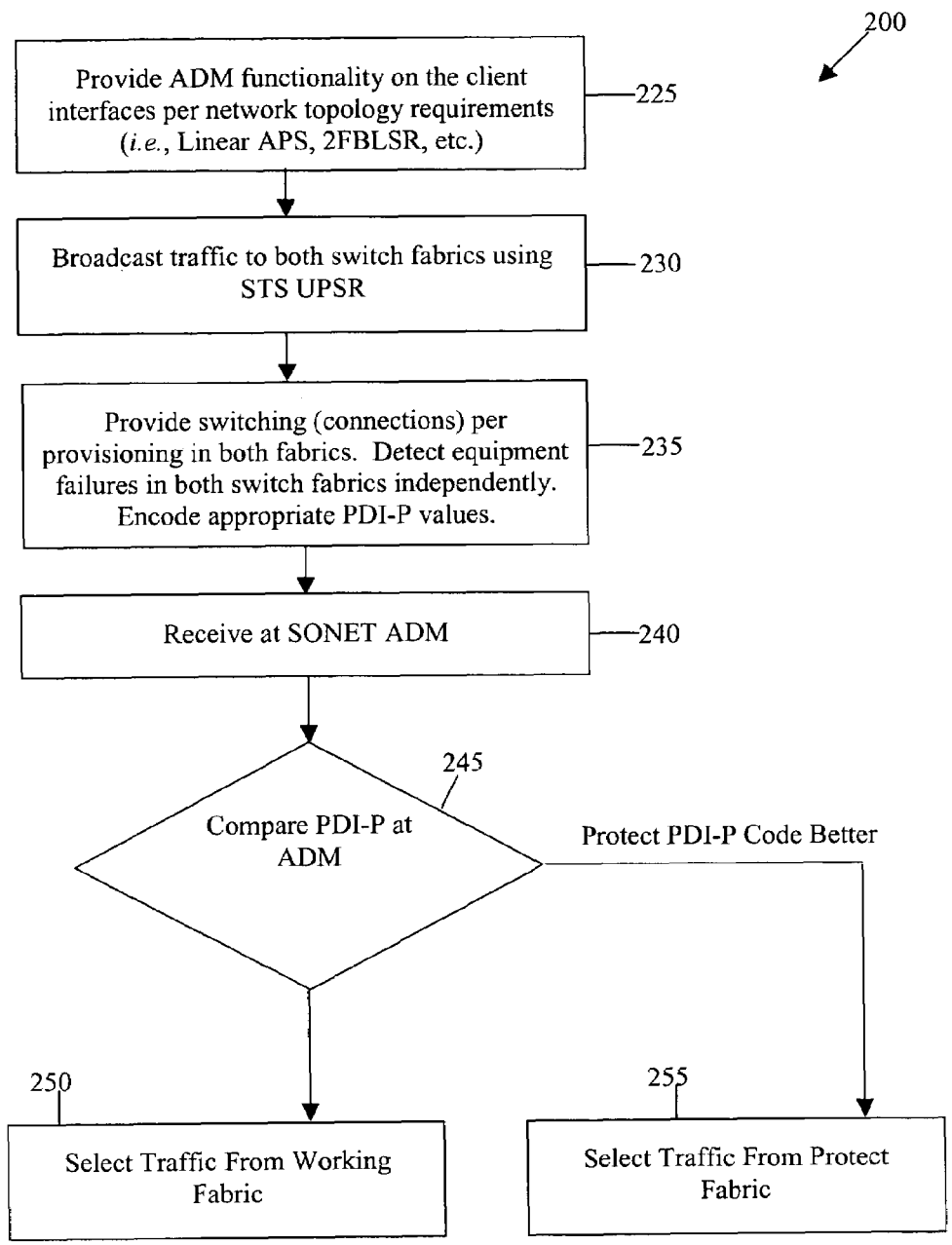
FIG. 2 is a flow chart of a method for protecting traffic according an embodiment of the present invention.

Referring now to FIG. 2, a method of providing equipment protection 200 according to an embodiment of the present invention is now discussed, with reference back to FIG. 1.

In step 225, ADM 103 performs ADM functionality on the client interfaces 105, 106, 107 as provisioned to meet the network configuration (i.e. 2FBLSR, 4FBLSR, STS1 UPSR, Linear APS).

In step 230, ADM 103 will configure working and protect interfaces 115, 116, and 117, as STS1 UPSR. This configuration, by requirement, will broadcast all traffic payloads to both switch fabrics 101 and 102.

In step 235, each switch fabric 101 and 102, will provide VT level switching (also commonly referred to as connections) of the payloads independently but equally as per provisioning requirements. In addition, each switch fabric will independently monitor for equipment failures that would affect the traffic payload. In the event a failure is detected on one or more entities, the switch fabric will provide PDI-P codes to signal the presence and quantity of affected VT path failures associated with the logical connections embedded within each STS1 within each physical interface to the SONET add/drop multiplexer.

Step 240 indicates the receiving of traffic at ADM 104 on each pair of interfaces as 125w and 125p, 126w and 126p, 127w and 127p. Each of these is configured as UPSR pairs.

In step 245 each working and protect pair, 125, 126, and 127, at ADM 104, receive traffic from switch fabrics 101 and 102. ADM 104 provides comparison and conclusion of each STS1 level PDI-P value.

In step 245, analysis is performed on the value of the PDI-P codes received from each switch fabric 101 and 102. In order to provide the best possible signal to the client, via connections 135w and 135p, for example, SONET add/drop multiplexer 104 selects between signals entering interfaces 125w and 125p from switch fabrics 101 and 102, respectively, by comparing the PDI-P codes carried in the overhead of each signal and choosing the best signal based upon the defect level to be the signal output through interfaces 135w and 135p, for example, to the client in steps 245, 250 and 255. For example, if the comparison shows that the defect level is better for the working signal received at switch interface 125w, it is selected to be sent to the client from interfaces 135w and 135p in step 250. If the defect level is better for the signal from the protect interface 125p, it is selected to be sent to the client from interfaces 135w and 135p in step 255.

The present invention allows standard SONET add/drop multiplexers to provide both standardized customer interfaces to a cross-connect system and switch fabric protection. A network operator could even utilize pre-existing SONET add/drop multiplexers in a network designed by different manufacturers to create the WideBand cross-connect system. The only requirement would be that the SONET add/drop multiplexers support SONET UPSR protection with PDI-P codes.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A WideBand cross-connect system comprising:
at least one SONET add/drop multiplexer being outfitted to support SONET unidirectional, path-switched rings protection with Payload Defect Indicator-Path codes;
a working WideBand switch fabric coupled to said at least one SONET add/drop multiplexer, said working switch fabric receiving a working signal from a first interface on said at least one SONET add/drop multiplexer, said working switch fabric switching said working signal to generate a working switched signal, monitoring for equipment failures that affect the working signal and to generate a working Payload Defect Indicator-Path code in response to monitoring for equipment failures and working switched payload, and providing said working switched signal to a second port on said at least one SONET add/drop multiplexer;
a protect WideBand switch fabric coupled to said at least one SONET add/drop multiplexer, said protect switch fabric receiving a protect signal from a third interface on said at least one SONET add/drop multiplexer, said protect switch fabric monitoring for equipment failures that affect the protect signal and switching said protect signal to generate a protect switched signal and to generate a protect Payload Defect Indicator-Path code in response to monitoring for equipment failures and protect switched payload, and providing said protect switched signal to a fourth port on said at least one SONET add/drop multiplexer;
wherein said at least one SONET add/drop multiplexer operates as an input/output interface to the working and protect WideBand switch fabrics and selects between said working switched payload and said protect switched payload to send to a client based upon said working Payload Defect Indicator-Path code And said protect Payload Defect Indicator-Path code.

2. A WideBand cross-connect system as in claim 1, wherein said at least one SONET add/drop multiplexer comprises a single SONET add/drop multiplexer.

3. A WideBand cross-connect system as in claim 1, wherein said at least one SONET add/drop multiplexer comprises a plurality of SONET add/drop multiplexers.

4. A WideBand cross-connect system as in claim 3, wherein said first port and said third port are on different SONET add/drop multiplexers of said plurality of SONET add/drop multiplexers.

5. A method of providing equipment protection in a cross-connect system comprising the steps of:
accepting an input client signal, said input client signal comprising payload, in at least one SONET add/drop multiplexer;
sending said payload to a working switch fabric from a first working signal interface of said SONET add/drop multiplexer and to a protect switch fabric from a first protect signal interface of said SONET add/drop multiplexer;
switching said payload in each of said working and protect switch fabrics;
generating Payload Defect Indicator-Path codes in each of said working and protect switch fabrics, wherein generating said Payload Defect Indicator-Path (PDI-P) codes in each of said working and protect switch fabrics, comprises:
monitoring by each of said working and protect switch fabric for equipment failures;

in response to a detected equipment failure, generating PDI-P codes by the switch fabric detecting an equipment failure to signal a presence of the equipment failure;

transmitting switched payload and said generated Payload Defect Indicator-Path codes by the working switch interface to a second working signal interface of said SONET add/drop multiplexer and by the protect switch fabric to a second protect signal interface of said SONET add/drop multiplexer;

receiving said switched payload and said Payload Defect Indicator-Path codes from each of said working and protect switch fabrics at said at least one SONET add/drop multiplexer;

analyzing said Payload Defect Indicator-Path codes by said SONET add/drop multiplexer and selecting said switched payload from either said working or said protect switch fabric as a working client payload based upon said analysis.

6. The method of providing equipment protection as in claim 5, wherein said Payload Defect Indicator-Path codes comprise a working Payload Defect Indicator-Path code and a protect Payload Defect Indicator-Path code and said analysis comprises comparing said working Payload Detect Indicator-Path code and said protect Payload Defect Indicator-Path code to determine which of said working Payload Defect Indicator-Path code and said protect Payload Defect Indicator-Path code indicates a less defective path.

7. The method of providing equipment protection as in claim 5, further comprising a step of outputting a SONET signal comprising said working client payload.

8. The method of claim 5, wherein the working switch fabric and the protect switch fabric are Wideband switch fabrics.

9. The method of claim 5, wherein monitoring by each of said working and protect switch fabrics for equipment failures comprises monitoring for equipment failures that affects said switched payload.

10. The method of claim 9, wherein generating PDI-P codes by the switch fabric detecting an equipment failure to signal a presence of the equipment failure further comprises providing PDI-P codes to signal a quantity of affected path failures in said switched payload.

11. A cross-connect system comprising:
a working switch fabric coupled to a first and a second working switch interface, wherein the working switch fabric is configured to:
receive a working signal from the first working switch interface;
monitor for equipment failures that affect the working signal;
generate a working switched signal;
generate a working Payload Defect Indicator-Path (PDI-P) code in response to monitoring for equipment failures; and
providing the working switched signal with the working PDI-P code to the second working switch interface; and
a protect switch fabric coupled to a first and a second protect switch interface, wherein the protect switch fabric is configured to:
receive a protect signal from the first protect switch interface, wherein the protect signal includes same payloads as the working signal;
monitor for equipment failures that affect the protect signal;
generate a protect switched signal;
generate a protect Payload Defect Indicator-Path (PDI-P) code in response to monitoring for equipment failures; and
providing the protect switched signal with the protect PDI-P code to the second protect switch interface.

12. The cross-connect system of claim 11, wherein the working switched signal and the protect switched signal are selected based upon comparison of the working PDI-P code and the protect PDI-P code.

* * * * *

UNITED STATES PATENT AND TRADEMARK OFFICE
CERTIFICATE OF CORRECTION

PATENT NO. : 7,602,701 B1
APPLICATION NO. : 10/743592
DATED : October 13, 2009
INVENTOR(S) : Parker et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Fifth Day of October, 2010

David J. Kappos
*Director of the United States Patent and Trademark Office*